Figure 1:
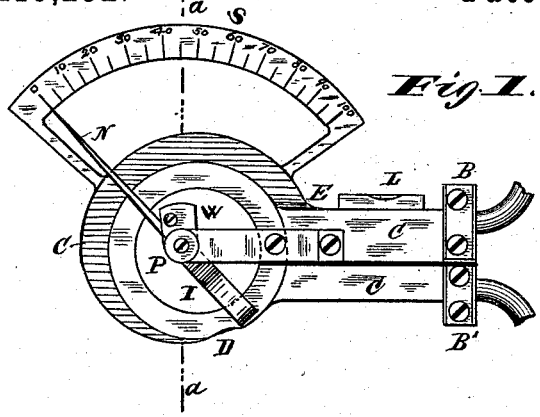

(No Model.) 2 Sheets—Sheet 1.

E. THOMSON.
ELECTRIC MEASURING INSTRUMENT.

No. 413,292. Patented Oct. 22, 1889.

WITNESSES:
Gabriel J. W. Galstey.
Wm H. Cahel

INVENTOR
Elihu Thomson
BY
Townsend MacArthur
ATTORNEYS (No Model.) 2 Sheets—Sheet 2.
E. THOMSON.
ELECTRIC MEASURING INSTRUMENT.
No. 413,292. Patented Oct. 22, 1889.
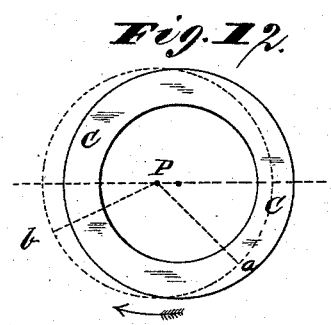
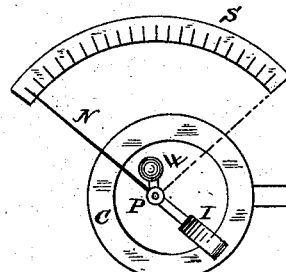
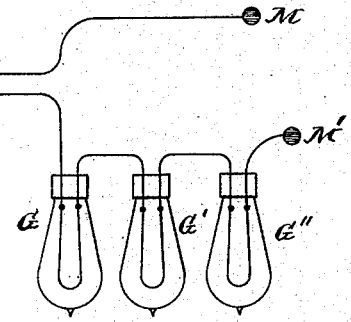
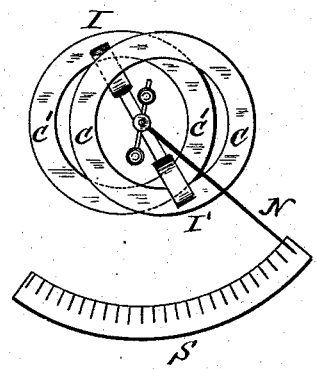
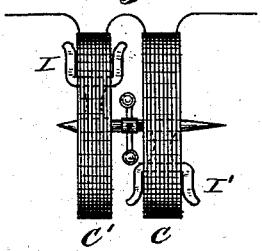
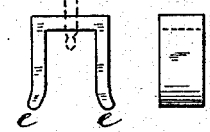
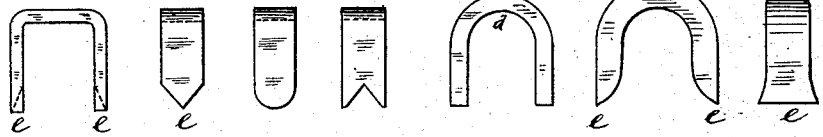
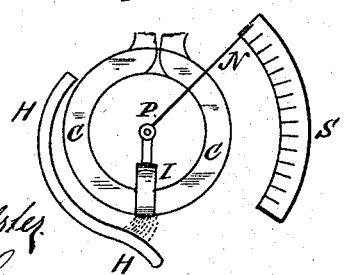
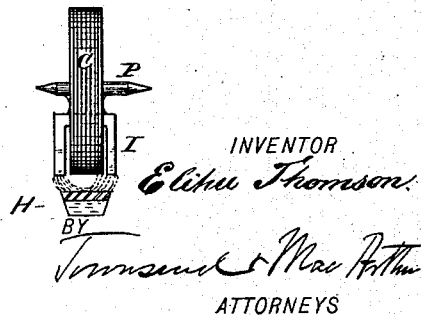
WITNESSES:
INVENTOR
Elihu Thomson
BY
Townsend & MacArthur
ATTORNEYS
N. PETERS, Photo-Lithographer, Washington, D. C.

UNITED STATES PATENT OFFICE.

ELIHU THOMSON, OF LYNN, MASSACHUSETTS, ASSIGNOR TO THE THOMSON-HOUSTON ELECTRIC COMPANY, OF CONNECTICUT.

ELECTRIC MEASURING-INSTRUMENT.

SPECIFICATION forming part of Letters Patent No. 413,292, dated October 22, 1889.

Application filed April 28, 1887. Serial No. 236,389. (No model.)

*To all whom it may concern:*

Be it known that I, ELIHU THOMSON, a citizen of the United States, and a resident of Lynn, in the county of Essex and State of Massachusetts, have invented certain new and useful Electrical Measuring-Instruments, of which the following is a specification.

My invention relates primarily to the electro-magnet which is used for giving motion to the index, pointer, recording-pencil, or marker, or other equivalent portion of the device; and it consists in the combination, with an electric conductor, of a mass of iron constantly and through its entire range of movement forming a partial magnetic circuit around the conductor, the movement of which mass, or of the conductor, one or both, in the general longitudinal direction of the conductor, under the influence of the current in the conductor, produces a change in the degree of closure of the magnetic circuit around the conductor by the iron mass.

In carrying out my invention the mass of iron only may move with relation to the conductor or the conductor move with relation to the iron, or both may move with relation to one another, or both may move together, as will hereinafter appear.

While, therefore, in my claim at the end of this specification I claim a movable iron mass arranged, as described, to partially close the magnetic circuit around the conductor in its normal position, I wish to be distinctly understood as including by said claims the converse cases and modifications just specified, some of the forms of which are hereinafter described.

The mass of iron which partially closes the magnetic circuit or field around the conductor is preferably of U form, the conductor being included between the two legs of the U, and the field around the same magnetically closed across the open ends of the legs. It is obvious, however, that the U-shaped piece might be severed at its base or the base removed, so that a break in the magnetic circuit formed by the iron mass would then exist at two points, at one or both of which the variable closure might be produced in the manner to be hereinafter described. The number of breaks might be still further increased, the mass of iron or armature, arranged, as described, to effect the variable closure of the magnetic circuit around the conductor at all portions of the range of movement of the apparatus, being properly mounted upon the end of an arm fixed or pivoted according to the specified construction, so that there is a bodily movement of the mass or armature when the conductor is stationary and the armature is movable. I prefer to use a mass of iron of general U form mounted to move bodily in a line such that the two sides or legs of the U will gradually move down over the conductor to either side thereof.

My invention consists also in certain details of construction and improved combinations of parts, which will be first described in connection with the accompanying drawings and then specified in the claims.

Figure 2:
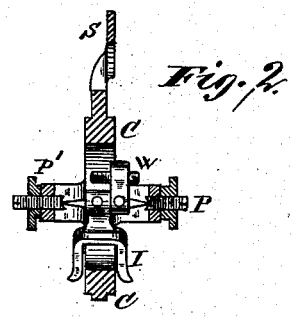
Figure 3:
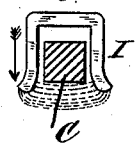
Figure 5:
Figure 7:
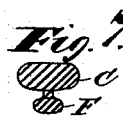
Figure 8:
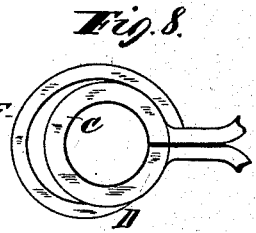
Figure 4:
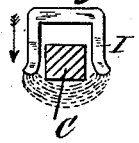
Figure 6:
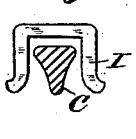
Figure 9:
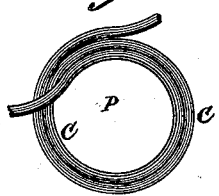
Figure 10:
Figure 11:
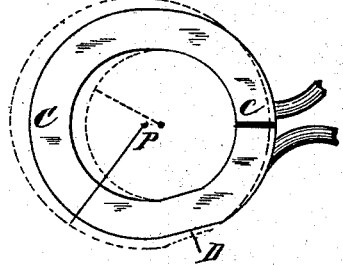

In the accompanying drawings, Figure 1 is a side elevation of an apparatus embodying my invention and properly constructed to indicate the passage of very heavy electric currents and their amount. Fig. 2 is a vertical section of the same apparatus on the line $a\,a$ of Fig. 1. Figs. 3, 4, and 5 are cross-sections through the electric conductor and illustrate the action of the device. Figs. 6 and 7 illustrate in cross-section modifications in the form of the electric conductor. Fig. 8 is a side elevation of another form of electric conductor adapted to some of the purposes of my invention. Fig. 9 is a side elevation of a conductor made as a coil, and Fig. 10 is a cross-section of the same. Fig. 11 illustrates the preferred form of the coil or conductor. Figs. 12, 13, 14, and 15 illustrate modifications adapted to measuring differences of potential. Fig. 16 shows in side elevation, and Fig. 17 in edge view, a form of the iron mass or U-shaped armature which I prefer to employ. Figs. 18, 19, 20, 21, 22, 23, and 24 illustrate other modifications in the form of the U-shaped piece. Fig. 25 shows in side elevation, and Fig. 26 in edge view, a modification of my invention.

In Figs. 1 and 2 C C C indicate a conductor of copper or other material, with binding posts or clamps B B' for receiving ends of circuit-wires on which instrument is placed. Current is passed from B to B', or the reverse, and traverses the conductor in a circular path, as shown, the parallel portions of the conductor being separated by a layer of insulation.

P P' indicate agate or ruby pivots for the needle-shaft, which carries the horseshoe or U-shaped piece of iron I, as shown. The pivots P P' are not in the center of the circular part of C C C, but are to the left and upward, as shown. A counter-weight W and the needle or pointer N serve together to so nearly counterbalance the weight of I and its supports that the resultant center of gravity will be situated so as to cause the needle to come to rest with the parts I W N about in the position shown in Fig. 1, N pointing to the zero of the divided scale S.

A level L may be used to assist in adjusting the level of the instrument.

The part C C C can be cast with the scale S and lugs to carry the pivots P P' all in one piece of copper, or it may be built up of parts. The exact relation of the axis between P P' to the curved circular portion of C C C is of considerable importance to the proper working of the instrument. While in the figure the external part of C C is shown as extended by a spiral web starting at D and ending at E, this is not essential, but the part of C C C around the axis could be made of a circular band without the web. The spiral web D E is of considerably less thickness than the circular part of C C C possesses. There is also a slight depression or concave spot in C C C, near the point D and to the left of the piece I when the needle is at zero, as shown. The reduction or contraction mentioned and the spiral web from D to E are added to insure by the depression at D the movement of the needle under small currents and to prevent by the web D E too great effect or movement with large currents.

Let C, Figs. 3 and 4, represent a section of C, as in Fig. 2. Now I, Fig. 4, occupies about the position relatively thereto that it does in Fig. 1. If current passes in C, magnetism developed in I tends to close its magnetic circuit around C externally, as indicated by dotted lines, Fig. 4, representing lines of magnetic force joining the ends of the horseshoe-magnet I. The parts in Fig. 4 will tend to move to position Fig. 3, in order that I may better close its magnetic circuit external to C, or in order that the magnetism developed in I may better conform to the circular magnetism developed around C by the current passing in it; but, as in Fig. 1 the part I is hung at P P', the movement from the position Fig. 4 to that Fig. 3 can only be accomplished by a swing to the left, which moves the pointer N to the right over the scale S and raises the combined center of gravity of N, W, and I by rotating it to the left and upward.

The effect of the spiral or expanding web which begins at D, Fig. 1, and extends around C C C, widening at the same time, is to give control of the amount of deflection producible by a given current and to prevent undue deflection by large currents. In fact, the form of the web and its thickness may be so selected with respect to the other parts as to give deflections proportional to the current instead of deflections in a higher ratio, as will be the case when such web or its equivalent is not used. The manner of its action is exemplified in Fig. 5. Since the whole section of C is traversed by the current, and web F is a part of that section, the passage of the magnetic lines from the ends of I over the exterior of C will be in part hindered by the current in F tending to force the lines to pass out around it. The ends of I are, as shown, preferably bent outward.

In Fig. 6 the form of C in section is such as to be the equivalent of C F, Fig. 5, and in Fig. 7 the section of C is again modified by addition of a smaller conductor F outside C, but at a varying distance from it. Thus in Fig. 8 D F shows this modification as a separate smaller band around C, placed spirally thereto, or thereabout.

Where it is necessary to have several turns in C, it can either be cast in duplicated sections and connected in series, or it may be a coil of wire C C, Figs. 9 and 10, in which the index is pivoted eccentrically, as at P. In such a case the best form of coil to use is not a circular one, but one which departs from a circular outline by having a slightly flattened or contracted place at D to correspond to the depression near D, Fig. 1, and which in passing around to the left from D widens from the circular outline indicated by the inner dotted circle, but which does not, however, pass out to the limit of the outer dotted circle, or that described by the ends of the piece I, Fig. 1, which overhang the coil C. Indeed, the ends of I should as the needle turns on its pivot P continually increase the overhang of the extremities of I, but at a rate only proportional to the increase of deflecting-power of the current. It is often, however, convenient to have the coil possess nearly or quite a circular form, as when used for voltmeter or potential indicators, and wound with comparatively fine wire. In such case the pivot P, Fig. 12, or center upon which the indicator turns, may be displaced or made eccentric to the coil one-sixth of the internal diameter, or one-third of the radius. In such case the practicable range of movement of the iron U-shaped piece or horseshoe will be from radius P $a$ to P $b$.

I prefer to use the instrument, as shown in Fig. 13, connected with mains M M', the potential between which is to be determined.

To avoid the necessity of winding coil C with very fine wire and to eliminate effects of increase of temperature in its coils, I place it in series with other resistances, as of German silver, or, better, of incandescent lamps G G' $G^2$—one or more—which resistances or lamps, as used, are run hot and form by far the larger part of the resistance in the branch from M to M'. They receive current of such amount as to maintain them at a temperature far superior to that of the air around, and are not therefore affected by air-temperature. The use of incandescent lamps gives another advantage. They may be so chosen that for given volts between M and M' they shall be heated to such a point (low redness) that their resistances are critical, or subject to fall on slight increase of current, or rise on decrease of current, due to changes in potential between M and M'. This gives greatly-enhanced sensitiveness to the indications of N I, because of the changes so occurring. Thus, if for one hundred (100) volts indicator N stands at 100 on the scale, a very small increase of volts will increase the current from M M' through G, &c., and lower the resistances of the carbon filaments, giving rise to further current increase and considerably increasing the deflection of N by the current in C. The reverse takes place on a fall of potential between M M'. The combination shown in Fig. 13 is therefore a very useful one for sensitive readings of volts between mains. In general, however, for potential readings the instrument may be further improved by duplication of the coil C and part I, as in Figs. 14 and 15. Here two coils C C and C' C' are so placed that one is in front of the other, but displaced, so that the indicator-axis is eccentric to one C by being on the left of its center and eccentric to the other C' by being on the right of its center. The iron pieces I I' are carried opposite and nearly or quite balance each other. Small counter-weights, adjustable, if needed, are provided to govern the position of the center of gravity of the system and cause the indicator to stand at zero when I I' are in the positions shown similar to that in Figs. 1 and 13. Where the two coils C C' thus act conjointly, greater sensitiveness and positiveness are secured. The form of the piece I may be greatly modified. In the preceding figures it has been considered as a flat bar of iron bent as shown in Figs. 16 and 17. It could be divided into several pieces or cut through the middle into two parts, but would be less sensitive. Instead of turning the ends e e outward they could be thinned or tapered, as indicated by dotted lines, Fig. 18, or tapered edgewise, as in Fig. 19, or rounded, as in Fig. 20, or notched or serrated, as in Fig. 21. The bend at d, Fig. 22, may be an angle, or, as shown, a portion of a curve or circle. The bar itself may be round, square, or rectangular, or other section, a rounded bar being shown in Figs. 23 and 24, with the ends e e tapered out and flattened. The section of the conductor or coil C may be square, round, or of other shape.

It is not essential that the pivot P for the index be eccentric to the coil C when equivalent conditions are existing for movement of the U-piece I; but when such equivalent conditions are not provided the pivot should be eccentric.

In Figs. 25 and 26 the axis at P is concentric with coil C, and bar I hangs suspended therefrom, as shown. In such case no movement of I would take place on current passing in the coil C; but if a bent plate or curved surface of iron H H be placed outside the coil, in a position somewhat spiral thereto, the ends of I can, by moving to the left in Fig. 25, gradually approach the piece H H, which may act as a keeper therefor. By suitably bending or shaping H H so as to secure various rates of approach of I to it, as the turning on its pivot takes place, any desired properties may be given to the instrument, such that the readings may be proportional to the current in C, or may be less or more than proportional to it. In this case conductor C and mass I might obviously be secured together and move as one; or, by shaping H H properly places of superior sensitiveness to slight changes of current in C may be produced, or the reverse. This is done by slightly changing the form of the surface of H H presented to I, so that the rate of approach of the ends of I toward H H is increased or diminished for a given range of movement of the pointer N over the scale S.

I do not limit myself to the special forms of apparatus hereinbefore described, since the principle of my invention may be embodied in other constructions.

What I claim as my invention is—

1. The combination, with an electric conductor carrying an electric current, of a mass of iron partially embracing said conductor and adapted to form through its whole range of movement from zero a partial magnetic circuit around the same and movable in the general longitudinal direction of the conductor to positions where it will gradually effect a change in the degree of closure of the magnetic field around the conductor, as and for the purpose described.

2. The conductor C, having its mass at one side modified or varied, as described, in combination with an armature adapted to partially close the magnetic circuit around said conductor, as and for the purpose set forth.

3. The combination, with an electric conductor, of a U-shaped armature or its equivalent, as described, mounted at the end of a pivoted arm and movable bodily in the general longitudinal direction of the conductor, as described, to positions where it may effect a variable closure of the magnetic circuit around the conductor, as set forth.

4. The combination of a conductor and an armature which normally partially embraces and closes the magnetic circuit around the conductor, said conductor or armature, one or both, being movable with relation to one another in the general direction of the axis of the conductor, as and for the purpose described.

5. The combination, substantially as described, of an electric conductor and a U-shaped armature partially surrounding the conductor and mounted, as described, on the end of a pivoted arm so as to have a movement of translation bodily over the conductor in the general direction of the axis of the same.

6. The combination, with the electric conductor, of a mass of iron partly encircling the same constantly or through its whole range of movement, said conductor and mass of iron being movable bodily with relation to one another, as described, in the general direction of the conductor's longitudinal axis, but at a slight angle, so that the conductor may be gradually included more and more within the iron, as and for the purpose described.

7. The combination, with two coils or conductors placed one beside the other, but eccentrically, of the two armatures or magnet-closing pieces, one for each coil, mounted upon a movable support or its equivalent, as described, and adapted to move in the general plane of the coils or conductors.

8. The combination, with the two conductors C, of the two armatures partially encircling the same in the zero position and mounted upon a common support in proper manner to balance one another.

9. The combination, with the curved conductor C, of the index and connected armature forming an iron mass partially surrounding the conductor and mounted on an arm pivoted eccentrically to such curved conductor, said armature consisting of one or more pieces of iron which normally or in the zero position of the apparatus overlap upon the sides of the conductor, as and for the purpose described.

10. The combination of the armature and the conductor C, having its mass near the open side of the armature, or just in advance of the same, reduced or contracted, as and for the purpose described.

11. The conductor C, having on its outer side a web of varying depth, in combination with the armature whose magnetic circuit is closed across or around said web.

12. The combination, with an electro-responsive device, of an artificial resistance of carbon connected to the circuit of the same and so proportioned with relation to the normal current that its resistance shall be critical or subject to immediate and sudden change on a change in the flow of current, whereby the change of current actuating the electro-responsive device may be magnified, as and for the purpose described.

Signed at Lynn, in the county of Essex and State of Massachusetts, this 23d day of April, A. D. 1887.

ELIHU THOMSON.

Witnesses:
   F. THOMSON,
   J. W. GIBBONEY.